June 1, 1954 F. A. RICHTER 2,679,968
PRINTED PACKAGE AND METHOD OF MANUFACTURING THE SAME
Filed Dec. 3, 1951
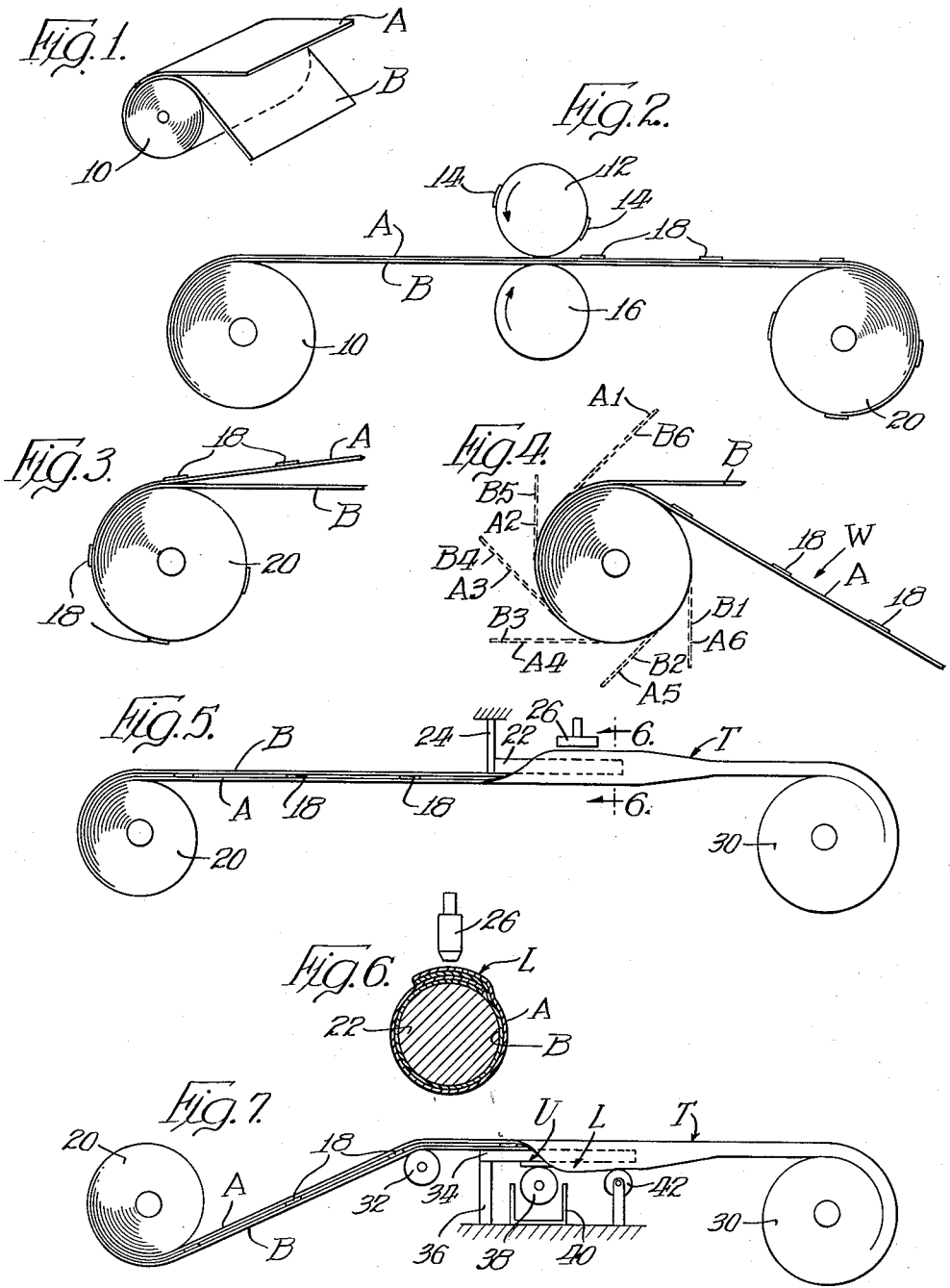
INVENTOR.
Frederic A. Richter
BY
Attys.

Patented June 1, 1954

2,679,968

UNITED STATES PATENT OFFICE 2,679,968

PRINTED PACKAGE AND METHOD OF MANUFACTURING THE SAME

Frederic A. Richter, Chicago, Ill., assignor to Transparent Package Company, Chicago, Ill., a corporation of Illinois Application December 3, 1951, Serial No. 259,644

7 Claims. (Cl. 229—3.5)

The present invention relates to methods of printing, particularly to methods of printing on film, and to printed film articles.

Various film materials are utilized as package forming media. For example, films are frequently formed into flexible tubes for the packaging of food products, such as cheese and ground meats, into bags for the packaging of innumerable items, such as food products, machine parts, clothing and the like. All these items require marking of the wrapper or package for identification of the article or articles contained therein. Likewise, merchandisers wish to employ attractive markings to impart sales appeal to the article.

One film that is particularly useful in packaging, and particularly for the packaging of food articles, is polyvinylidene chloride, which is known commercially as Saran. Saran is particularly advantageous for the packaging of food products, since it is insoluble in most organic liquids, is resistant to chemical attack, is resistant to acids, organic solvents and alkalies, is relatively unaffected by age, is inert to metals at room temperature, has good welding ability, is strong, nonflammable, non-toxic, tasteless and ordorless, has extraordinarily low water absorption and water vapor transmissivity, and is unaffected by folding and creasing. Accordingly, its merits as a packaging material are obvious. However, polyvinylidene chloride, or Saran, film suffers one decided disadvantage that has restricted its use, and that is the difficulty of applying markings thereto.

Much experimentation has been carried out in an endeavor to provide an ink that would successfully adhere to polyvinylidene chloride film. While many links have appeared to work satisfactorily, in use, all have readily worn or flaked away from the surface of the film during packaging and handling of the package or were so soft as to cause severe offset when the printed web was rewound. As a result, printed Saran film has not been widely utilized. Merchandisers have resorted to separate insert labels or tags to identify the contents of the package—an undesirable, costly operation.

As the ultimate in merchandising appeal, the package should disclose the contents thereof, should have an identifying label or marking, and should have decorative features or printing or other markings that distinctively set off the contents of the package to attract the attention of the consumer to the package and the article contained therein. Saran, or polyvinylidene chloride, film readily meets the first of these requirements in that same in substantially colorless and is transparent. However, the other two desirable features have not, heretofore, been satisfactorily attainable with Saran.

An object of the present invention is to provide a method of printing Saran or polyvinylidene chloride films and the end product resulting therefrom.

While the present invention has particular adaptability to the printing of Saran, it will be apparent, as the description proceeds, that the method of the present invention and the product thereof may be readily carried out and effected on other films.

Another object of the present invention is to provide a printing method for printing film materials in such manner that in the ultimate product, the printing impression is protected on both sides by the film itself.

A further object of the present invention is to provide a method of printing including the printing of the film and the proper coordination of the printed film for use in packages.

A still further object of the present invention is to provide a printing method wherein what have heretofore been regarded as difficulties of offset are eliminated and wherein offset is taken advantage of to produce an improved printed film.

In carrying out my invention, I preferably utilize rolls of double wound film, print on one side of one sheet or layer of film and then superpose the other sheet or layer of film on top of printed images on the one film, so that the printed images are confined between the two layers of film. Thereafter, the film may be suitably passed through conventional machinery for forming tubular stock or for forming bags from the double thickness film. The manner of superposing said other layer of film on the printed images on the said one film is preferably accomplished by rewinding the double wound film on a spool or the like after the printing operation, so that in rewinding, the printed images are confined between the surface of the film on which printed and the opposite surface of the other film. This has the effect of adhering a slip sheet to each printed image wherein the slip sheet is permanently associated with the printed image. Any offset to the film surface laid over the printed matter is not objectionable, since the two surfaces are not again separated. Consequently, the method of the present invention gives complete freedom from non-registered offset, which is a major problem in all kinds of web printing, but especially so in Saran printing, particularly where the stock is rewound after printing. The usual methods of minimizing offset, such as spraying, dusting, or rewinding with slip sheets are entirely unnecessary and the difficulties consequent upon minimizing offset are eliminated. When a complete roll of double wound film has been printed and rewound, the outer turn of the outer film layer on the rewound printed roll will either be a film surface on which the images are printed, or will be a blank film that does not engage any of the printing material. This outer film is unwound from the roll either by making one full turn of the layer of film about the roll or by unwinding one full turn of the originally paired film layers from the printed roll and rewrapping the inner layer about the roll so that same becomes the outer layer on the rewound printed roll. The unwinding, or unwinding and rewrapping, effects a separation of the two film surfaces which were originally paired in winding the original unprinted rolls. Thereafter, the printed roll may be unwound, again as a double wound film, with the printed images confined between the two interior surfaces of the said double wound film, so that the printed images are not exposed to abrasive or solvent action of any materials.

The end product of the method of the present invention has the advantages, among others, that any offset occurring after printing remains in register with the printed impression so that it does not detract from the appearance of the printed film. This allows greater diversity in choice of inks since freedom from offset and blocking is no longer a necessary characteristic of the ink. Additionally, the printed image cannot be scraped or removed from the film, the printed image cannot come into contact with the articles or materials to be received within the package, and the gloss of the unprinted exterior surface of the base film imparts a brilliance to the printing which cannot be matched by merely printing on the exterior surface of the film.

Another advantage of the invention is that it allows higher press speeds since it is no longer necessary to dry the ink completely before rewinding.

Other objects and advantages of the present invention will become apparent in the following detailed description of preferred embodiments of the invention, wherein reference is made to the accompanying drawings, in which:

Figure 1 is a perspective view of a double wound film;

Figure 2 is a schematic representation of the double wound film being passed through a printing press and being wound upon a second spool;

Figure 3 is a view in side elevation of the completed roll of printed double wound film;

Figure 4 is a schematic representation of a manner in which the exterior surface of the completed roll is unwound to properly correlate the two films and the image-bearing surface of the printed film;

Figure 5 is a schematic representation of the printed double wound film being passed over a mandril and being seamed to form a tubular packaging material which is rewound on a spool or the like;

Figure 6 is a cross-sectional view taken substantially on the line 6—6 of Figure 5, on an enlarged scale; and Figure 7 is a schematic representation of a printed double wound film being passed over a suitable mandril, and being sealed, by gluing, to form a completed tubular material that may be utilized as tubular packaging material.

Referring now to the drawings, and particularly to Figure 1, the double wound film, which is particularly adapted for utilization with the present invention, is indicated generally at 10 as comprising a cylindrical roll of two sheets of film, indicated at A and B. The double wound rolls may be formed in any conventional manner. In the case of Saran film, which is made by extruding a thin walled tube of large diameter, the tube is flattened and is then slit at either edge thereof and rewound on a spool or roll, so as to provide the resultant double film on a single roll, as indicated in Figure 1. The two layers, in the case of Saran film, have a natural affinity for one another and tend to cohere. This feature is particularly advantageous in carrying out the present invention, although other types of film not having such "self-adhesive" character may also be used. Likewise, the two films need not be of the same material, nor of the same width or size.

Referring now to Figure 2, the double wound roll 10 is shown diagrammatically as being mounted for rotation, so that the films A and B may be unwound therefrom. The films A and B are unwound simultaneously from the roll 10 and passed through a pair of rollers comprising a printing cylinder 12 carrying printing plates 14 and an impression cylinder 16. The printing mechanism is merely shown schematically, and it will be appreciated that any type of continuous web printing apparatus or mechanism may be utilized in carrying out the present invention. The printing plate 14 leaves printed impressions, as indicated diagrammatically at 18, on the film A. After passage through the printing press, the films A and B are rewound on a spool or cylinder 20. In rewinding the film on the spool 20, the printed images 18 on the outer surface of the film A will be brought into contact with the outer surface of the film B and thereafter there will be no shifting between the two sheets, so that the printed image 18 is positively confined between what were originally the outer surfaces of each of the films. Accordingly, any offset from the image 18 onto the outer surface of the film B will not be in any way disadvantageous.

A wide variety of inks may be used satisfactorily since a high degree of adhesion to the base film is unnecessary. The inks need not be rapid drying nor need they be hard enough to prevent offset or blocking. Soft inks that cause blocking of the roll are actually preferable for the present invention, since they tend to act as binders to cement the two layers of film together in the desired relationship. In addition, the natural cohesion of the films assist in the binding of the outer surfaces of the films A and B to one another. After passage through the printing press, the ink is preferably, but not necessarily, dried to a tack free condition. It will be appreciated, however, that some softness of the ink may be desirable to assist in the binding of the two layers together. By speeding up the operation of the printing press so that the drying period between the press and the rewinding roll 20 is shortened, offset of the printed image 18 from the film A to the film B will occur to assist in binding what were originally the outer surfaces of the two films together. When the entire roll of film 10 has been unwound and passed through the printing press and rewound onto the spool or cylinder 20, the cylinder 20 may be removed from the delivery end of the printing press and positioned at the start of a machine adapted to form completed containers from the printed film.

The completely printed roll of double wound film is shown in Figure 3 as comprising an outer layer of film A containing the printed images 18 on top thereof and an inner layer B. The inner layer B in actuality abuts against the printed surface of the portion of the sheet A immediately beneath the sheet B on the roll. Accordingly, it will be appreciated that the last turn of the printed sheet A has no covering surface therefor, and is to be regarded as waste. To properly coordinate the now printed double wound film, the sheet A may be stripped from the sheet B and unwound from the spool 20, from the position shown in Figure 3, through the positions A1, A2, A3, A4, A5 and A6, indicated by dotted lines in Figure 4, to the position shown in solid lines in Figure 4, wherein the top surface of the film A engages the bottom surface of the film B, to confine the printed images 18 on the film A between what was originally the outer surface of the film B and what was originally the outer surface of the film A, with the unwound last or outer turn of the film A, indicated at W, being regarded as waste. Accordingly, it will be appreciated that in the completed roll, the exposed outer surfaces of the two films are those surfaces which were originally the inner paired surfaces of the two films. The waste portion of the film A, indicated at W in Figure 4, may be cut from the roll. As an alternative to the foregoing, one complete turn of the films A and B may be unwound from the spool 20 and the sheet B may be stripped from the sheet A and rewrapped on the roll 20 through positions B1, B2, B3, B4, B5 and B6 corresponding to the positions A6, A5, A4, A3, A2 and A1, respectively, to the final relationship shown in solid lines in Figure 4. From the foregoing, it also will be appreciated that the printed film may be wound in either direction on the roll 20 after passage from the printing apparatus without departure from the results noted hereinbefore.

The completed product of the printing method is shown at the left in Figure 5 as comprising a roll of double wound film having printed images thereon confined between the paired layers of the film. At the right in Figure 5 I have shown one matter in which the completed printed double wound and properly disposed film may be suitably sealed into tubular form, or other like form, for utilization as a container. In this instance, the spool 20 is mounted at the lead end of a conventional sealing machine and the double wound film is fed therefrom and onto a mandril 22, which is supported by means of a stationary support 24. The film is turned from either side of the mandril over onto the upper surface of the mandril, so that the two edges of the film overlap, as indicated at L in Figure 6. After the films have been overlapped, the same may be suitably sealed together by means of conventional machinery, which may include a movable longitudinal bar 26 adapted to be brought down into engagement with the surface of the double wound film to seal the overlapping portions of the films together in a conventional manner. In the case of Saran, the bar 26 is preferably connected to a source of high frequency electrical power and adapted to weld the overlapping portions of the film together. It will be appreciated, of course, that the manner of sealing the overlapping portions of the film together may be accomplished in any desired or customary manner. After being sealed, the now tubular film T passes off the free end of the mandril 22 and may be suitably flattened and wound upon a spool 30 for shipment to packaging plants or the like.

In the case of film materials, which are not adapted for welding or heat sealing, it is necessary to glue the overlapping portions of the films together. Such apparatus is shown schematically in Figure 7 wherein the spool or roll of double wound film 20 is mounted for rotation at the lead end of the machine and is passed over a supporting roller 32 and over the top of a suitable mandril 34 which is provided with a stationary support 36. One edge of the film is turned under the mandril, as indicated at U, for passage over and into engagement with a gluing roller 38 rotatably mounted in a glue bath 40 to provide a thin strip of adhesive on the one edge of the film. Thereafter, the opposite edge of the film is turned under the mandril and rolled into overlapping engagement with respect to the glued portion of the film, as indicated at L. The overlapping portions of the film may be passed over a compression roll 42 adapted to effect firm cementing of the overlapping portions of the film together. Thereafter, the tube T formed by the gluing operation may be suitably wound on a finish spool or roll 30, by means of which the tubing may be suitably supplied to packaging firms. While in both Figures 5 and 7 I have disclosed the formation of the double wound film into continuous tubing, it will be apparent that the printed double wound film may be passed through other suitable machinery for the formation of bags, or substantially any type of film container. In use, the natural cohesion of the film materials and the adhesive effect of the printing ink will serve to retain the two films A and B in engagement with one another, so that the printed images are confined between the two base films, and so that the two films cannot be readily separated from one another to allow the printed images to become exteriorly exposed. If desired, suitable adhesive may be applied to the film during printing to provide a more positive bond between the layers.

With regard to the "eye appeal" of the printed matter on the film, I have found that the brilliance of the printing is enhanced by printing on the inside surface of the outside layer of the film. For example, referring to Figures 5 and 7, the printed image 18 is contained on the inner surface of the film A. Accordingly, it is most advantageous to have the film A constitute the outside surface of the ultimate container into which the film is formed. I have shown in Figures 5 and 7 the manner in which the film may be folded and overlapped, so that the film A constitutes the outside film of the completed container, as will be apparent from Figure 6. However essentially the same result may be attained by using inks sufficiently soft to provide essentially complete offset to the opposing surface. With this method of printing the image will display the proper aspect when viewed through the originally unprinted film of the double wound pair. It will be apparent that either reverse or direct printing may be practiced depending upon the relationship desired according to the foregoing.

In practicing the present invention, it is preferred that the printed images be so disposed on the film, or that the film be so used, that the ends of the film at the ends of the double wound rolls 20, at the ends of the rolls 30 and at the ends of packages formed from the product of the present invention, carry a printed image that acts as an adhesive at the ends of the film to prevent separation of the two films, or at least to prevent accidental separation of the two films.

While the present invention is preferably practiced on and includes double wound film, the same result may be obtained by printing a single thickness film and feeding in a second unprinted film on the rewind after printing to produce a double wound printed film.

The present invention, while it utilizes two layers of film, does not result in waste, since the completed double wall packages need be only the thickness of a specific normal single wall for the package.

While I have described what I regard to be the preferred embodiments of my invention, it will be apparent that certain changes and rearrangements and variations may be made therein without departing from the scope of the present invention, as defined by the appended claims.

I claim:

1. A method of producing a two-layer film having printed images confined between the said film layers which comprises the steps of printing images on an outer surface of a double wound transparent plastic film, the layers comprising said double wound film being characterized by having adequate inherent cohesive affinity with respect to each other to maintain the layers in intimate contact with each other; winding the double wound film in a roll, separating the free ends of the originally paired surfaces of the two layers of film at the outer end of the roll; and placing the printed surface of one film layer against a surface of the other film layer so as to provide, as the roll is unwound, a two layer film having visible printed images confined between the film layers.

2. A method of producing a packaging material in the form of a two-layer film having printed images confined between the said film layers which comprises the steps of printing images on an outer surface of a double wound transparent polyvinylidene chloride film; winding the double wound film in a roll; separating the free ends of the originally paired surfaces of the two layers of film at the outer end of the roll; and placing the printed surface of one film layer against a surface of the other film layer so as to provide, as the roll is unwound, a two layer film having visible printed images confined between the film layers.

3. A package formed of two plies of cohering transparent polyvinylidene chloride film, the face-to-face surfaces of said plies being in intimate contact with each other, one of said plies having printing on that surface which is in intimate contact with a surface of the other ply.

4. The article of claim 3 wherein the said package is in the form of a bag.

5. The article of claim 3 wherein the said package is in the form of a flexible tube.

6. A flexible tubular container formed of multiple-layered cohering transparent polyvinylidene chloride film with reversed images printed on the inner surface of an outer layer of said multiple-layered film, the face-to-face surfaces of said layers being in intimate contact with each other.

7. A package formed of two plies of thin, flexible, cohering polyvinylidene chloride film at least the outer one of which is transparent, the face-to-face surfaces of said plies being in intimate contact with each other, one of said plies having printing on that surface which is in intimate contact with a surface of the other ply.

References Cited in the file of this patent

UNITED STATES PATENTS

| Number | Name | Date |
| --- | --- | --- |
| 1,714,265 | Gurwick | May 21, 1929 |
| 2,166,819 | Miller | July 18, 1939 |
| 2,307,406 | Howard | Jan. 5, 1943 |
| 2,347,439 | Shea et al. | Apr. 25, 1944 |
| 2,472,551 | Smith | June 7, 1949 |
| 2,487,061 | Ptasnik | Nov. 8, 1949 |
| 2,491,048 | Jenkins | Dec. 13, 1949 |
| 2,504,500 | Collins | Apr. 18, 1950 |
| 2,529,884 | Reynolds | Nov. 14, 1950 |
| 2,536,773 | Saidel | Jan. 2, 1951 |
| 2,545,710 | Snyder | Mar. 20, 1951 |
| 2,568,463 | Reynolds | Sept. 18, 1951 |
| 2,585,924 | Freedman et al. | Feb. 19, 1952 |
| 2,622,991 | Sturm | Dec. 23, 1952 |
| 2,648,463 | Scherer | Aug. 11, 1953 |